Figure 1:
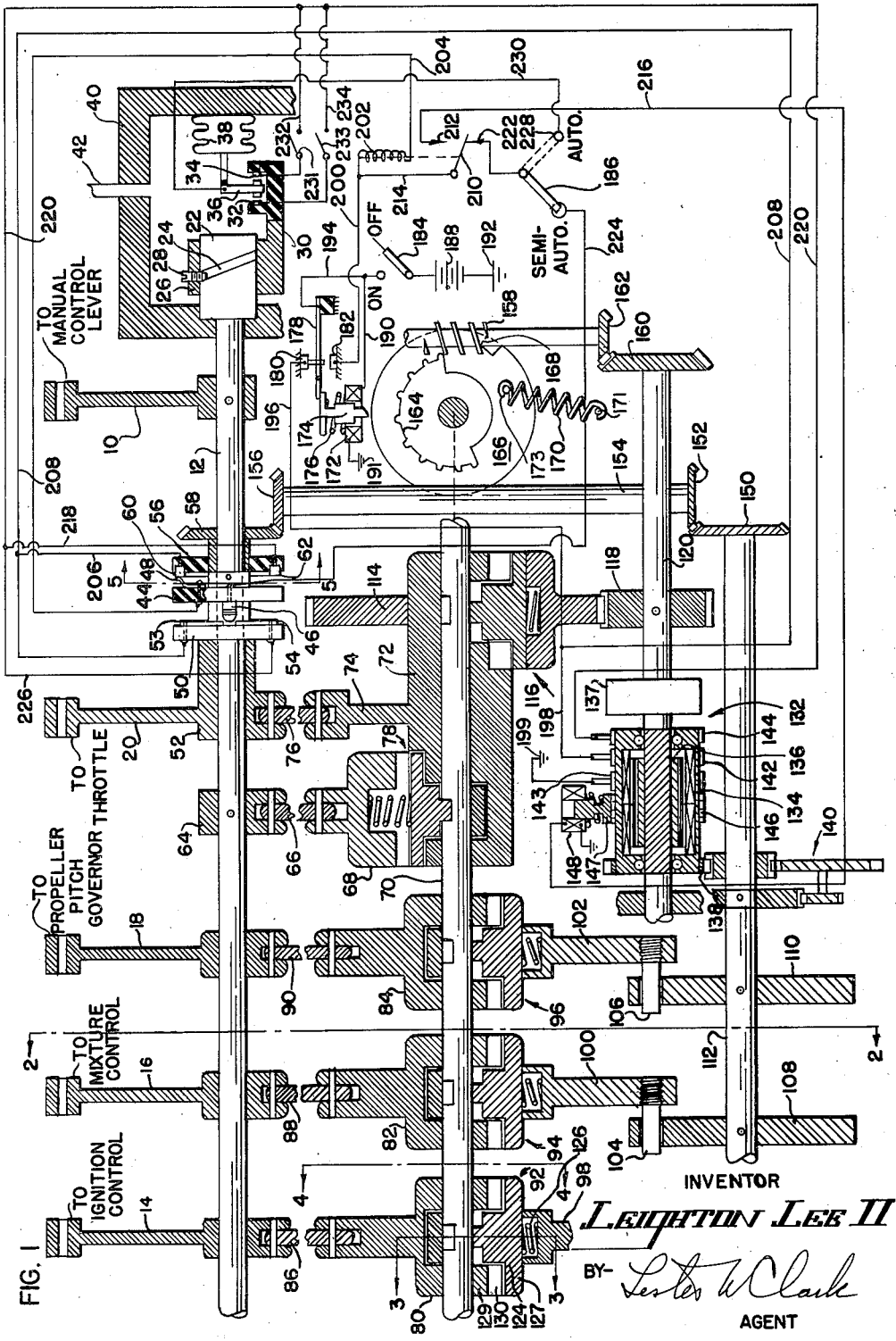

Sept. 23, 1947.  L. LEE, 2D  2,427,794
CONTROL APPARATUS
Filed Dec. 31, 1943  5 Sheets-Sheet 2

INVENTOR
*Leighton Lee II*
BY- *Lester W Clark*
AGENT

Sept. 23, 1947.  L. LEE, 2D  2,427,794
CONTROL APPARATUS
Filed Dec. 31, 1943  5 Sheets-Sheet 5

INVENTOR.
*Leighton Lee II*
BY
*Lester W Clark*
AGENT

Patented Sept. 23, 1947

2,427,794

UNITED STATES PATENT OFFICE 2,427,794

CONTROL APPARATUS

Leighton Lee, II, Meriden, Conn., assignor, by mesne assignments, to Niles-Bement-Pond Company, West Hartford, Conn., a corporation of New Jersey Application December 31, 1943, Serial No. 516,407

33 Claims. (Cl. 123—98)

1

The present invention relates to control apparatus for internal combustion engines.

The invention is described herein as applied to an internal combustion engine used on aircraft, although it may be applied to other internal combustion engines. The internal combustion engines now in common use on aircraft require many manually operated control devices to regulate their operation. These devices usually include the throttle, the mixture control, the ignition timing control, the propeller pitch or engine speed governor, and the carburetor air temperature control. In addition to these usual controls, other accessories may be provided such as water injection valves, fuel selector valves, etc. In order to obtain the best engine operation at any given power output, all these control devices have to be adjusted to particular settings. The setting of each of these control devices demands attention from the pilot, who also has many other duties to perform besides controlling the engine. As a result the pilot usually must neglect the setting of one or more of these control devices with the result that the efficiency of the engine is impaired.

It is therefore an object of the present invention to provide control apparatus for simultaneously positioning a plurality of control devices of an internal combustion engine in order to maintain optimum conditions of engine operation. Another object of the present invention is to provide a control system in which a single lever operable by the pilot or other member of the aircraft crew, determines the setting of a plurality of devices for controlling conditions relating to the operation of the engine.

Another object is to provide a system of the type described in which the manually movable lever may selectively be used either to control motor means for setting all the control devices or to manually position the throttle only.

A further object of the present invention is to provide an improved motor control system in which a single motor is used to perform a number of different functions. Another object is to provide, in such a system, an improved clutch means driven by the motor for connecting it to a load device.

A further object is to provide improved clutch means for connecting a motor to a plurality of load devices.

Other objects and advantages of the present invention will become apparent from a consideration of the appended specification, claims and drawing, in which

2

Figure 2:
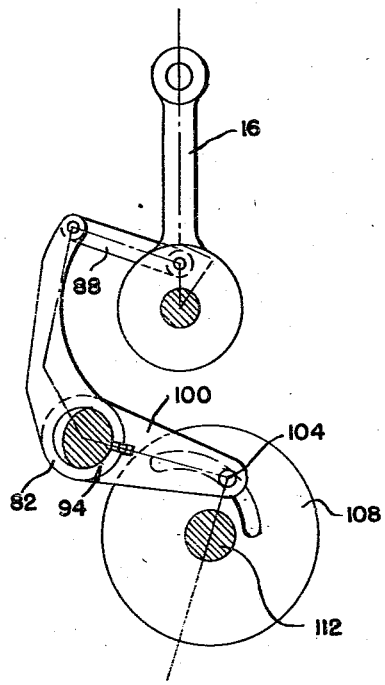
Figure 3:
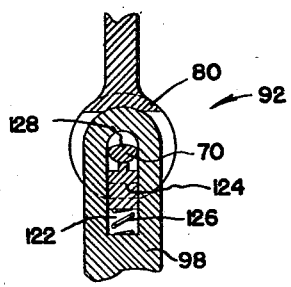
Figure 4:
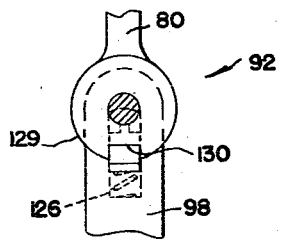
Figure 5:
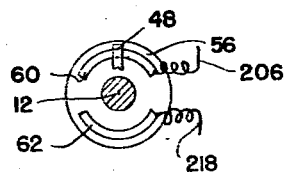
Figure 6:
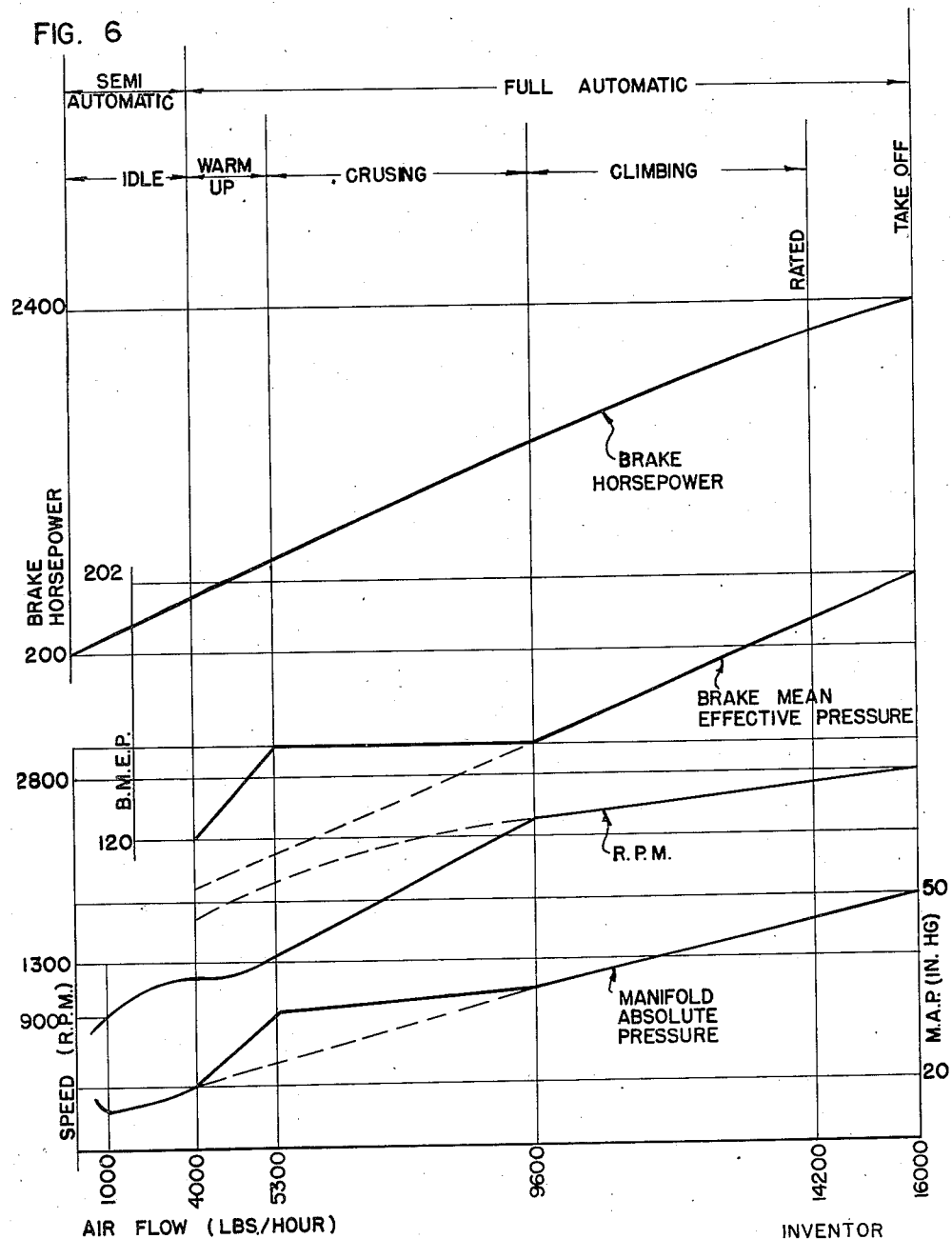
Figure 7:
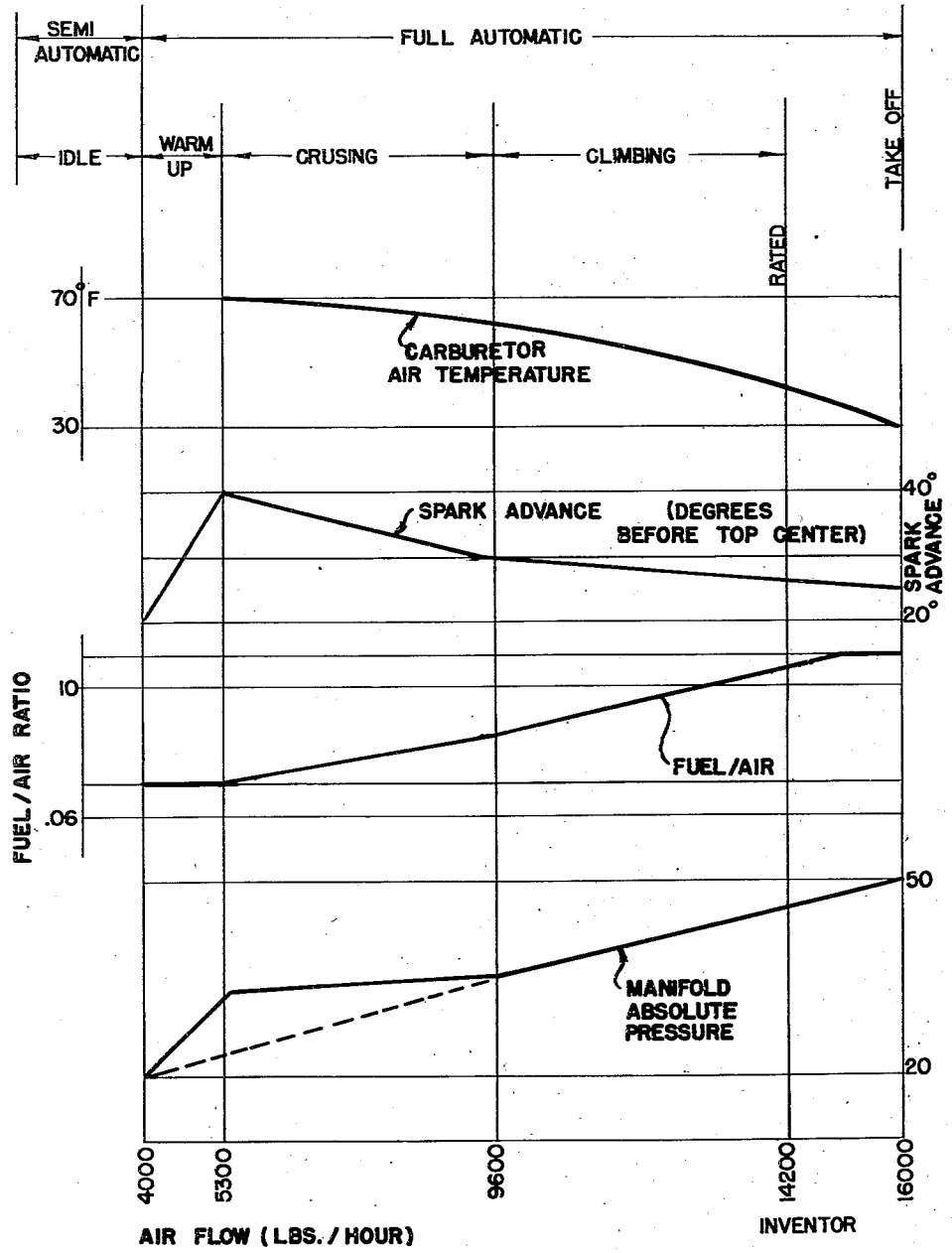
Figure 8:
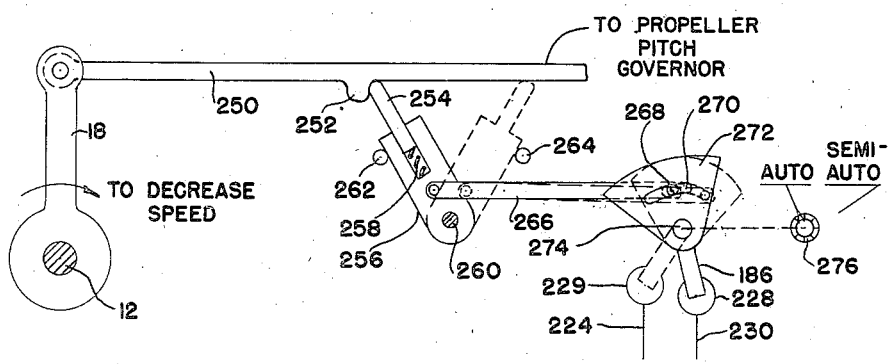
Figure 9:
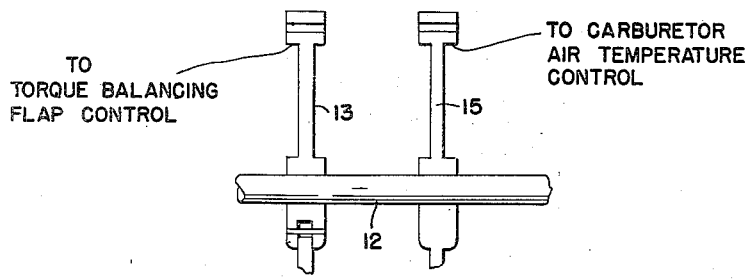

Figure 1 is a somewhat diagrammatic illustration, partly in section, of a control system for an internal combustion engine embodying the principles of my invention, Figure 2 is a cross-sectional view taken along the line 2—2 of Figure 1, looking in the direction of the arrows, Figure 3 is a cross-sectional view of a clutch illustrated in Figure 1, taken along the line 3—3 of Figure 1 and looking in the direction of the arrows, Figure 4 is an elevational view of the clutch mechanism illustrated in Figure 3, taken along the line 4—4 in Figure 1, Figure 5 is an elevational view of a switch contact structure taken along the line 5—5 in Figure 1, and looking in the direction of the arrows, Figure 6 is a graphical illustration of the relationship between various conditions of engine operation which may be obtained by the use of my invention, Figure 7 is another graphical illustration of other conditions of engine operation obtainable thru the use of my invention, Figure 8 is a somewhat diagrammatic illustration of an interlocking mechanism which may be used in the control system of Figure 1, and Figure 9 is an extension of a portion of Figure 1, illustrating certain additional controls which may be connected to that system.

Referring to Figure 1, there is shown an arm 10 which is adapted for attachment thru suitable linkage to the pilot's control lever. The lower end of arm 10 is fixed to a shaft 12. A series of arms 14, 16, 18 and 20 are pivotally mounted on the shaft 12, and each of these arms is adapted for attachment to a control device associated with the engine. As indicated by the legends in the drawing, the arm 14 may be connected to the ignition timing control, the arm 16 may be connected to the fuel and air mixture control, the arm 18 may be connected to the propeller pitch or engine speed governor and the arm 20 may be connected to the throttle. The arms 14, 16 and 18 are also preferably connected to manually operable levers under the control of the pilot, or other crew member.

The right end of shaft 12, as it appears in Figure 1, carries an enlarged portion 22 having a groove 24 cut in its surface. A collar 26 surrounds the enlarged portion 22 of shaft 12 and is restrained from rotation with the shaft 12 by means not shown. A set screw 28 is threaded thru the collar 26 so that its inner end rides in the groove 24. The construction is such that as shaft 12 is rotated, the collar 26 is moved lengthwise on the enlarged portion 22 of shaft 12.

An extension 30 of the collar 26 insulatingly carries a pair of contacts 32 and 34 which cooperate with a contact member 36 insulatingly carried by a bellows 38. The bellows 38 is sealed. This bellows and the mechanism which operates the contacts 32 and 34 is mounted in a housing 40 whose interior are connected by a conduit 42 to the intake manifold of the internal combustion engine being controlled. The bellows 38 therefore responds to the absolute manifold pressure.

As an alternative mode of operation, the interior of bellows 38 and the interior of housing 40 may be connected respectively to a pair of pressures whose difference indicates the quantity of air flowing to the engine for combustion purposes. In place of the mechanism shown somewhat diagrammatically in the housing 40, I prefer to use a device of the type shown and claimed in my copending application Serial No. 514,022, filed December 13, 1943.

A disc 44, of insulating material, is fixed on the shaft 12 for rotation therewith and carries a pair of contact fingers 46 and 48 on its opposite surfaces. Another insulating disc 50 is attached to a hub 52 which carries the throttle arm 20. The disc 50 supports a pair of contacts 53 and 54 which cooperate with the contact 46 carried by disc 44. A third insulating contact disc 56 is rotated about the shaft 12 by the hub of a bevel gear 58 driven by a mechanism to be described in detail hereinafter. The disc 56 carries a pair of contacts 60 and 62 which cooperate with the contact finger 48 carried by disc 44.

A hub 64 is attached to the shaft 12, and is pivotally connected to a link 66. The other end of link 66 is pivotally attached to a hub 68 rotatable about a clutch shaft 70. Also rotatable about clutch shaft 70 is an elongated sleeve or hub 72. The sleeve 72 carries an arm 74 connected by a link 76 to the hub 52 of throttle arm 20. The sleeve 72 may be connected to the hub 68 for rotation therewith by a clutch mechanism generally indicated at 78, shown in its engaged position.

A gear 114 is rotatable about the sleeve 72. The gear 114 may be fixed on the sleeve 72 by means of a clutch mechanism 116. The gear 114 mates with a gear 118 fixed on a shaft 120.

Hubs 80, 82 and 84 are also rotatably mounted on the shaft 70, and are connected thru links 86, 88 and 90 respectively, with the control arms 14, 16 and 18. The hubs 80, 82 and 84 may be connected by means of clutches 92, 94 and 96, respectively, with cam follower arms 98, 100 and 102. The cam follower arm 98 is not completely shown in the drawing, but the cam follower mechanism associated with it is substantially the same as those associated with arms 100 and 102, which are shown in detail.

The arms 100 and 102 carry at their respective ends pins 104 and 106. The pins 104 and 106, respectively, move in slots in disc cams 108 and 110 fixed on the shaft 120. The pins therefore serve as cam followers.

The clutch mechanisms 78, 92, 94, 96 and 116 are all generally similar. The clutch mechanism 92 is shown in detail in Figures 3 and 4. Referring to those figures, it may be seen that the cam follower arm 98 is provided with a central recess 122, in which a key 124 moves under the influence of a compression spring 126 and a cam surface 128 formed on the shaft 70. As may be seen in Figure 1, the key 124 is generally T shaped, and is provided with lateral extensions 127. The extensions 127 are alined with shoulders 129 in the hub 80. Each shoulder 129 is notched, as at 130, so that the extensions 127 may be received in the notches.

Referring to Figures 3 and 4, it may be seen that when the clutch shaft 70 is rotated 180° from the position shown, the key 124 then engages the low point of the cam surface 128, against which it is forced by the spring 126. The extensions 127 then move into engagement with the notches 130, if they are angularly alined, and the arm 98 is then locked to the hub 80 so that the two move together. When the parts of the clutch are in the positions shown in Figures 1, 3 and 4, the hub 80 and the arm 98 are free to move angularly with respect to each other. If the extensions 127 and the notches 130 are not angularly alined, then the key 124 cannot engage the low point of cam 128 when the shaft 70 is rotated 180° from the position shown. Instead, the extensions 127 then ride on the shoulders 129. Then if by rotation of hub 80 or arm 98 the notches 130 become alined with extensions 127, the extensions move into the notches under the influence of spring 126, thereby locking hub 80 and arm 98 together.

The shafts 112 and 120 are both driven by the same electrical motor generally indicated at 132. The motor 132 consists of two concentric relatively rotatable members 134 and 136. For the sake of convenience, the members 134 and 136 will be hereinafter referred to as the stator and rotor respectively, altho in the construction shown, the stator 134 is not stationary. The rotor 136 is connected to the shaft 120 thru a reduction gear indicated schematically at 137. The stator 134 carries an external gear 138 which drives the shaft 112 thru a reduction gear generally indicated at 140. Slip rings 142, 143 and 144 are mounted on the outside of stator 134, in order to conduct electric current to the windings on the stator. Altho no means are shown for conducting current to the windings on the rotor 136, it will be readily understood that such means may be provided if the motor is of a type requiring it.

Motor 132 is provided with two windings which when energized cause opposite reactions between the stator and rotor. The winding which, when energized, causes clockwise rotation of shaft 120, as viewed from the right end, is hereinafter referred to as the clockwise winding. Similarly, the winding which causes counterclockwise rotation of shaft 120 is referred to as the counterclockwise winding. These windings are not individually shown in the drawing, for the sake of simplicity. Of course, the clockwise winding causes counterclockwise rotation of the stator, as viewed from the right end, and the counterclockwise winding causes clockwise rotation of the stator. The clockwise winding is connected to slip ring 144 and the counterclockwise winding is connected to slip ring 142.

A brake band 146 is also attached to the outside of stator 134. A brake 147 is biased to engage brake band 146 and prevent movement of stator 134. An electromagnet 148 is effective when energized to move brake 147 away from band 146 and thereby release stator 134.

The cam shaft 112 drives the gear 58 and disc 56 thru bevel gears 150 and 152, a shaft 154 and a bevel gear 156 which mates with gear 58.

In addition to gear 118, the shaft 120 drives a worm 158 thru a pair of bevel gears 160 and 162. The worm 158 cooperates with a sector worm wheel 164 attached to the clutch shaft 70. The worm wheel 164 is provided with teeth on its periphery over a sector which extends slightly more than 180°. The remainder of the periphery of the worm wheel is recessed so that it does not engage the worm 158.

The clutch shaft 70 also carries a disc 166, which is notched as at 168. A tension spring 170 is mounted between a stationary pin 171 and a pin 173 on disc 166 to bias the clutch shaft 70 to an angular position in which the toothed sector of the worm wheel 164 engages the worm 158. An electromagnetic latching mechanism 172 is provided to hold the disc 166 and the clutch shaft 70 in a different angular position wherein the worm 158 is free of the worm wheel 164. The electromagnetic latching mechanism 172 includes a latch member attached to its armature 174, which is biased by a spring 176 to a position wherein the latch member is free of the disc 166. When the electromagnetic mechanism 172 is energized, the latch member is moved downwardly into engagement with the periphery of disc 166. Then when the disc 166 is rotated to a position such that notch 168 is aligned with the latch member, the latter drops into the notch and thereafter retains the disc 166 in that angular position. The upper end of armature 174 engages the tip of a switch finger 178 which moves between a pair of stationary contacts 180 and 182, being self-biased to engage contact 182.

A master switch 184 is provided for turning the system on and off, and a single-pole, double-throw selector switch 186 is provided for selecting different modes of operation of the system.

*Operation*

When the parts are in the positions shown in the drawing, the various control arms 10, 14, 16, 18 and 20 are independently movable to operate the control devices connected thereto. Manipulation of the lever at this time causes operation of the throttle lever 20. The mechanical connection between these two may be traced from lever 10 thru shaft 12, hub 64, link 66, hub 68, clutch 78, sleeve 72, arm 74, link 76, hub 52 and throttle arm 20.

The system may be operated to act as a follower mechanism so that the various control levers 14, 16, 18 and 20 are driven to angular positions corresponding to that of the manual control lever 10. This mode of operation of the system will be hereinafter referred to as semi-automatic operation. In order to secure this mode of operation, the selector switch 186 is moved to the position illustrated in full lines in the drawing, and the switch 184 is closed. This completes a circuit for energizing the latching electromagnet 172 and another circuit for energizing motor 132. The circuit for electromagnet 172 may be traced from the upper terminal of a battery 188 thru switch 184, a conductor 190, electromagnet 172, and ground connections 191 and 192 to the lower terminal of battery 188. The circuit for energizing motor 132 may be traced from the upper terminal of battery 188, thru switch 184, a conductor 194, switch finger 178, contact 180, a conductor 196, a conductor 198, slip ring 142, the counterclockwise winding on stator 134, a slip ring 143, and ground connections 199 and 192 to the lower terminal of battery 188. The winding energized thru this circuit is the one which causes shaft 120 to be rotated in a counterclockwise direction as viewed from the right end in Figure 1. Therefore bevel gear 162 is driven clockwise as viewed from below in Figure 1 and the worm 158 engages worm wheel 164 driving the latter and the shaft 70 clockwise. The clockwise rotation of disc 166 initially releases some of the tension in spring 170, but after pin 173 reaches its bottom center position, the spring 170 is stretched until the pin 173 reaches its top center position. After that, the spring 170 aids the motor in causing further clockwise rotation of the disc 166. When the worm 158 reaches the end of the toothed sector of worm wheel 164, which occurs after the pin 173 passes top center, the spring 170 causes further clockwise rotation of disc 166 until the latch member drops into the notch 168, whereupon the disc 166 is effectively locked against further rotation. Since the worm 158 does not then engage the worm wheel 164, the motor 132 is free to rotate the shaft 120 in either direction without causing any movement of shaft 70.

The rotation of shaft 70 thru 180° in the operation just described results in a disengagement of clutch 78 and makes possible the engagement of clutches 92, 94, 96 and 116 whenever the extensions 127 of any of the latter clutches become angularly alined with the associated notches 130. The disengagement of clutch 78 breaks the mechanical connection between the manual control lever 10 and the throttle arm 20. The angular alinement of the extensions 127 and notches 130 of the clutches 92, 94 and 96 may be accomplished by manually moving the notched hubs 80, 82 and 84 by means of the levers 14, 16 and 18, respectively, until the notches and extensions become aligned, whereupon the clutches engage and further manual movement of the levers becomes impossible. In the case of clutch 116, however, the angular alinement of the clutch notches and extensions is accomplished by the rotation of gear 114 on the sleeve 72. The gear 114 is rotated whenever the control system calls for an operation of the throttle, and when once started, continues until the throttle has been moved to the desired position. Therefore, when rotation of gear 114 starts at a time when the notches and extensions of clutch 118 are not aligned, those parts become aligned at some point in the first revolution of gear 114, the clutch 118 then engages the gear 114 with sleeve 72, and thereafter the throttle is driven as required by the control system. The mechanical connection between the rotor 136 of motor 132 and the throttle arm 20 may be traced thru shaft 120, gears 118 and 114, clutch 116, sleeve 72, arms 74, link 76, hub 52 and arm 20. When the control arms 14, 16 and 18 are connected to their respective cams, they are operated by stator 134 of motor 132. In the case of the arm 18, the connection may be traced from stator 134 thru gears 138 and 140, shaft 112, cam 110, cam follower pin 106, arm 102, clutch 96, hub 84 and link 90 to control arm 18.

When the armature 174 moves the latch member downwardly into the notch 68, the switch finger 178 is simultaneously disengaged from contact 180 and moved into engagement with contact 182. This completes an energizing circuit for motor 132 in which the position of contact 48 with respect to the contacts 60 and 62 determines the direction of operation of stator 134. The angular position of contact 48 corresponds to that of the manual control lever 10 and the angular positions of contacts 60 and 62 correspond to the angular position of the cam shaft 112. If the angular position of cam shaft 112 is displaced with respect to the angular position of shaft 12 so that the contact 48 engages either of the contacts 60 and 62, then the motor is energized to drive the stator in a direction so that the disc 56 is rotated until the switch finger 48 lies between the two contacts 60 and 62, at which time the circuit is broken.

Whenever either of the circuits controlled by contact 48 is completed, the electromagnet 148 is energized by a circuit to be traced hereinafter, thereby disengaging brake 147 from brake drum 146 and allowing stator 134 to rotate. Since the rotor 136 is at this time connected to the throttle thru the reducing gear 137, the load on the stator 134 is relatively lighter than that on the rotor and energization of the motor windings at this time therefore causes rotation of the stator 134 rather than of the rotor 136.

For example, if the position of contact 48 with respect to disc 56 is that illustrated in Figures 1 and 5, then an energizing circuit for the motor is completed which may be traced from the upper terminal of battery 188, thru switch 184, conductor 194, switch finger 178, contact 182, a conductor 200, relay winding 202, a conductor 204, contact 48, contact 60, a conductor 206, a conductor 208, conductor 198, slip ring 142, the counterclockwise winding on stator 134, slip ring 143 and ground connections 199 and 192 to the lower terminal of battery 188. This winding is the same one whose energization previously caused rotation of shaft 120 in a counterclockwise direction, as viewed from the right end. Therefore energization of this same winding now causes the rotation of stator 134 in a clockwise direction. This causes shaft 112 to be rotated counterclockwise as viewed from the right end, thereby rotating shaft 154 clockwise as viewed from the bottom. The gear 58 and disc 56 are thereby driven counterclockwise as viewed in Figure 5. This motion continues until the circuit is broken by the movement of contact 48 to the dead spot between the two contacts 60 and 62.

Energization of relay winding 202 causes switch arm 210 to engage a front contact 212, thereby completing a circuit for energizing the electromagnet 148 so as to release brake 147. This circuit may be traced from the upper terminal of battery 188 thru switch 184, conductor 194, switch finger 178, contact 182, conductor 200, a conductor 214, switch arm 210, contact 212, a conductor 216, electromagnet 148 to ground and thru ground connection 192 to the lower terminal of battery 188.

As soon as the disc 56 has reached the angular position in which the switch finger 48 lies between the contacts 60 and 62, then the cam shaft 112 has been moved to an angular position corresponding to that of control lever 10, and the cams have operated their respective control devices to the operating conditions which are best for that position of the control lever 10.

If the control shaft 12 and the cam shaft 112 are displaced so that switch finger 48 engages contact 62 then the clockwise winding of motor 132 is energized thru a circuit which may be traced from the upper terminal of battery 188 thru switch 184, conductor 194, switch finger 178, contact 182, conductor 200, relay winding 202, conductor 204, switch finger 48, contact 62, a conductor 218, a conductor 220, a brush, slip ring 144, the clockwise winding on stator 134, slip ring 143, and ground connections 199 and 192 to the lower terminal of battery 188. This causes operation of disc 56 in a clockwise direction as viewed in Figure 5 until the contacts 48 and 62 are separated.

When the angular position of cam shaft 112 corresponds to that of shaft 12, the contact finger 48 lies between the contacts 60 and 62 and the relay winding 202 is then de-energized. The switch arm 210 then engages a back contact 222, and the energizing circuit for the brake releasing electromagnet 148 is interrupted at the contact 212. The stator 134 is therefore locked against rotation. Furthermore, a circuit is completed which places the motor windings under the control of the contact 46, which is positioned by the shaft 12, and the contacts 53 and 54, which are positioned concurrently with the throttle arm 20.

If the angular position of throttle arm 20 is then displaced in a clockwise direction, as viewed from the right end, from the position shown in Figure 1, so that contact finger 46 engages contact 54, a circuit is completed for energizing motor 132 to drive the hub 52 and throttle arm 20 in a counterclockwise direction until the contacts 46 and 54 are separated. This circuit may be traced from the upper terminal of battery 188 thru switch 184, conductor 194, switch finger 178, contact 182, conductors 200 and 214, switch arm 210, contact 222, switch 186, a conductor 224, contact 46, contact 54, a conductor 226, conductor 220, a brush, slip ring 144, the clockwise winding on stator 134, slip ring 143 and ground connections 199 and 192 to the lower terminal of battery 188. Energization of this winding of motor 132 causes shaft 120 to turn clockwise as viewed from the right in Figure 1, thereby driving gear 114 and sleeve 72 counterclockwise as viewed from the right. This counterclockwise motion is transmitted thru link 76 to hub 52. On the other hand if the relative angular position of shaft 12 and hub 52 is such that contact 46 engages contact 53, then the motor energizing circuit proceeds as previously traced to the contact 46 and then thru contact 53, conductors 208 and 198, a brush, and slip ring 144 to the counterclockwise winding of motor 132. This causes operation of throttle arm 20 thru the linkage previously traced, in a clockwise direction as viewed from the right end.

If it is desired to operate the throttle to maintain a constant value of intake manifold pressure, the selector switch 186 is operated to the dotted line position shown in the drawing. Under these conditions, the operation is the same as under "semi-automatic" conditions except that the throttle is under the control of the bellows 38.

If the intake manifold pressure increases, bellows 38 collapses causing engagement of contacts 34 and 36. This completes an energizing circuit for the counterclockwise winding of motor 132. This circuit may be traced from the upper terminal of battery 188 thru switch 184, conductor 194, switch finger 178, contact 182, conductors 200 and 214, switch arm 210, contact 222, switch 186, contact 228, a conductor 230, contacts 36 and 34, a limit switch 231, a conductor 232, conductors 208 and 198, a brush, slip ring 142, the counterclockwise winding of motor 132, slip ring 143 and ground connections 199 and 192 to the lower terminal of battery 188. The throttle arm 20 is thereby moved in a direction to close the throttle, thereby decreasing the intake manifold pressure to the value selected by manipulation of control lever 10.

If the intake manifold pressure decreases below the selected value, the bellows 38 expands, causing engagement of contacts 32 and 36 and completing an energizing circuit for the clockwise winding of motor 132. This circuit may be traced along the circuit last traced to contact 36 and then thru contact 32, a limit switch 233, a conductor 234, a conductor 220, a brush, slip ring 144, the clockwise winding of motor 132, slip ring 143, and ground connections 199 and 192 to the lower terminal of battery 188. This causes operation of the throttle arm 20 in a throttle opening direction, thereby increasing the intake manifold pressure to restore it to its previously selected value. The limit switches 231 and 233 are positioned adjacent the throttle operating mechanism so as to be opened when the throttle moves to its closed and open positions, respectively.

From the foregoing, it may be seen that when the system is in manual operation, all the various control levers are separately movable. If desired, the spark timing and mixture control levers may be mechanically interlocked, so that the mixture control lever may not be moved to a lean position without advancing the spark at the same time. If desired, a gated interlock may be used so that it may be overridden in emergencies.

When the system is in semi-automatic operation, all the levers act as followers to the main manual control lever 10. When the system is in automatic operation, the throttle is controlled to maintain a constant intake manifold pressure and the other levers are positioned to correspond with the particular value of manifold pressure selected by the position of lever 10. When such devices are provided, the system may also be used to control the waste gate of a turbo-supercharger, or the gear shift of an engine driven supercharger, to aid the throttle in maintaining a constant manifold pressure. Such an arrangement is shown in my co-pending application Serial No. 514,022, filed December 13, 1943.

In automatic operation, all the pilot's levers in the cockpit are always linked to their respective engine controls, and hence their positions indicate the values at which the respective controls are set.

When the system is shifted from automatic operation to manual operation, all the control levers such as 14, 16 and 18 in Figure 1, which are not thereafter manually moved, remain in the position which they had during automatic operation. If it is desired to change the position of one of the levers while keeping the others under automatic control, this may be accomplished by placing the system temporarily on manual operation, moving the one lever whose position is to be changed, and then restoring the system in automatic operation. The one lever which was moved will not then be picked up by its clutch until the automatic system calls for a movement of that lever to the position to which it has been set.

There is illustrated in Figure 6 a series of curves illustrating the variation of manifold pressure, propeller speed, brake mean effective pressure and brake horse power with the quantity of air flowing to the engine for combustion purposes. These curves may be used as a basis for the design of the cam 110 and the cam groove 24 (see Figure 1) which determine the relationship between manifold pressure and motor speed for any given position of the control lever 10. In any given engine, the speed of the engine in revolutions per minute and the manifold pressure determine the air flow. The curves of Figure 6 are illustrative of the relationship obtained in an engine of 3350 cubic inches displacement. The engine speed and the manifold pressure also determine the brake mean effective pressure and the brake horse power, since those quantities, for a given engine, can be varied only by varying the engine speed or the manifold pressure.

In Figures 6 and 7, the range of air flows from 0 to 4000 lbs. per hour has been designated the "idle" range, the range between 4000 to 5300 lbs. per hour is called the "warm-up" range, the range from 5300 to 9600 lbs. per hour is the "cruising" range, the range from 9600 to 14,200 is the "climbing" range, and the range from 14,200 to 16,000 lbs. is the "take-off" or maximum power range.

It has been found desirable to select the propeller pitch for maximum propeller efficiency during the climbing and take off ranges of engine operation and to select the propeller pitch and manifold pressure for maximum engine efficiency during the cruising range. It has been found that the most efficient propeller operation is obtained when the propeller power output varies as the cube of its speed. The relationship between brake mean effective pressure, propeller speed, manifold pressure and air flow for a maximum propeller efficiency is illustrated by the curves appearing in Figure 6 in full lines thru the climbing and take off ranges and in dotted lines thru the warm-up and cruising ranges. The curves appearing in full lines thru the warm-up and cruising ranges illustrate the conditions which provide best engine efficiency, and hence best fuel economy. It has been found that the fuel economy occasioned by the gain in engine efficiency obtainable during the cruising range is greater than the loss in propeller efficiency occasioned by the departure of the propeller speed and power relationship which gives maximum propeller efficiency. The gain in engine efficiency results in an increased range of the aircraft.

It is indicated in Figures 6 and 7 that the "semi-automatic" mode of operation corresponds to the idle range and that the "automatic" mode corresponds to the higher air flow ranges. This is meant to indicate the range in which the respective modes of operation are normally used. The semi-automatic mode of operation may be used at any air flow. The full automatic mode of operation, however, may not be used at air flows in the idle range, because of a phenomenon known as "boost reversal."

"Boost reversal" is the name applied to a change in the normal variation of intake manifold pressure with engine speed, which takes place under certain conditions. In most types of internal combustion engines, the intake manifold pressure decreases with an increase in engine speed, if the throttle position and other factors affecting the intake manifold pressure remain constant. Also, the manifold pressure usually increases as the throttle is moved toward open position. In some engines, however, at slow speeds, this normal state of affairs is reversed so that the intake manifold pressure increases as the throttle moves toward closed position. The reason for this phenomenon is that the engine intake valves on high speed engines are set to open before the engine has completed its exhaust stroke. When the engine is running fast, the inertia of the gases in the cylinder and the manifolds is sufficient to prevent any exhaust gas from passing out through the intake valve when it first opens. At low speeds, however, some of the burned gases in the engine cylinder pass out through the intake valve and into the intake manifold, causing an increase in the pressure there.

Since the present system, when using the automatic mode of operation, responds to an increased manifold pressure by a closing movement of the throttle, it may be seen that if the automatic control were used under conditions where a boost reversal might take place, the occurrence of that phenomenon would result in a complete closing of the throttle. It is therefore necessary that the present system be operated according to the semi-automatic mode, instead of the full automatic, through the idle range. If desired, an interlock may be arranged between the engine speed governor lever 18 and the selector switch 186, so that whenever the engine speed is lower than the value at which boost reversal occurs, for example 900 R. P. M., the switch 186 is moved to the semi-automatic position.

Figure 8 illustrates such an interlocking arrangement. A link 250, pivotally attached to the end of arm 18, is provided with a lug 252 which engages a pin 254 which is inserted in a socket in the end of an arm 256. A spring 258 in the socket biases the pin 254 outwardly into engagement with the link 250 or lug 252. The arm 256 is pivoted at 260, and its range of movement is limited by a pair of stops 262 and 264. A link 266 is pivotally attached to the arm 256 near its center, and at its opposite end carries a pin 268 which extends into a slot 270 in a plate 272 which is pivotally mounted at 274. The plate 272 carries a switch 186, which is the same as switch 186 of Figure 1. The position of switch 186 determines whether the system is operated in the "semi-automatic" mode or the "automatic" mode. The plate 272 and switch 186 may also be operated by means of a manual knob 276.

The propeller pitch governor control arm 18 is moved in a clockwise direction, as viewed in Figure 8, to decrease the engine speed. When a predetermined speed setting is reached, the lug 252 engages pin 254, and causes rotation of arm 256 in a clockwise direction. The clockwise movement of arm 256 does not initially affect the position of switch 186. As soon as the arm 256 passes its vertical position, the spring 258 pushes the pin 254 outwardly, and causes the arm 256 to snap over against the stop 264. When this snap action takes place, the pin 268 engages the end of slot 270 and rotates plate 272 clockwise, moving the switch arm 186 from engagement with contact 228 to contact 229. This changes the system from the automatic mode of operation to the semi-automatic.

In Figure 7 there are illustrated curves which may be made the basis for the design of cams setting the carburetor air temperature, ignition timing, and fuel to air ratio controls with respect to the manifold pressure and air flow. The advance of the spark and the lean fuel to air ratio during the cruising range are provided in the interest of economy. The richer mixture and less advanced spark in the climbing and take off ranges are provided to secure better engine cooling conditions.

There is shown in Figure 9 an extension of shaft 12 on which are mounted an arm 13 connected to a torque balancing flap control and an arm 15 connected to a carburetor air temperature control.

The carburetor air temperature is decreased with increased air flow, as shown in Figure 7, in order to take advantage of the increased air density at the lower temperature and hence the increased mass of air which can be introduced in the engine cylinders at each stroke.

In addition to the conditions specifically illustrated in Figure 1, this apparatus may be used to control other conditions relating to the functioning of an aircraft. For example, as shown in Figure 9, it might be used to regulate torque balancing flaps. By positioning such flaps as a function of the engine horse power, the tendency of the reaction of the propeller to twist the plane may be overcome. Furthermore, flaps may be provided to correct the tendency of the aircraft to climb or dive due to the changes in the longitudinal thrust. In rotary winged aircraft, the torque balancing may be performed by means other than flaps, but it still may be regulated as a function of the horse power output of the engines.

While I have shown and described a preferred embodiment of my invention, other modifications thereof will readily occur to those skilled in the art, and I intend my invention to be limited only by the appended claims.

I claim as my invention:

1. Control apparatus for an internal combustion engine, comprising throttle means for controlling the flow of air to said engine for combustion purposes, a manually movable control member, motor means, first clutch means operable to connect said throttle means and said control member, second clutch means operable to connect said throttle means and said motor means, operating means for both said clutch means movable between a first position wherein said first clutch means may be engaged and said second clutch means is disengaged and a second position wherein said first clutch means is disengaged and said second clutch means may be engaged, means biasing said clutch operating means to said first position, means for locking said clutch operating means in said second position, a worm driven by said motor means, a sector worm wheel connected to said clutch operating means for movement therewith and adapted to be driven by said worm, means responsive to a condition indicative of the need for operation of said throttle means, and means for transferring control of said throttle means from said control member to said condition responsive means, said last-named means including means for initiating operation of said motor in a direction to drive said clutch operating means thru said worm and sector worm wheel toward said second position, and means effective upon movement of said clutch operating means to said second position to operate said locking means and to place said condition responsive means in control of said motor means.

2. Control apparatus for an internal combustion engine, comprising throttle means for controlling the flow of air to said engine for combustion purposes, at least one control device movable to establish the value of a condition of engine operation, motor means, first motion-transmitting means, including first clutch means, operable to connect said motor means and said control device, second motion-transmitting means, including second clutch means, operable to connect said motor means and said throttle means, third clutch means operable to connect said throttle means and said member, operating means for all said clutch means movable between a first position wherein said third clutch means may be engaged and said first and second clutch means are disengaged and a second position wherein said third clutch means is disengaged and said first and second clutch means may be engaged, means biasing said clutch operating means to said first position, means for locking said clutch operating means in said second position, a worm driven by said motor means, a sector worm wheel connected to said clutch operating means for simultaneous movement therewith and adapted to be driven by said worm, means responsive to the relative positions of said control member and said control device, means responsive to a condition indicative of the need for operation of said throttle means, and means operable to transfer control of said throttle means from said control member to said condition responsive means and to position said control device, said last-named means including means for initiating operation of said motor in a direction to drive said clutch operating means thru said worm and sector worm wheel toward said second position, means effective upon movement of said clutch operating means to said second position to operate said locking means, to place said motor means under control of said position responsive means to drive said control device thru said first motion-transmitting means to a position corresponding to that of said control member, and means effective upon movement of said device to said corresponding position to place said motor means under control of said condition responsive means to drive said throttle means thru said second motion-transmitting means.

3. Control apparatus for an internal combustion engine, comprising throttle means for controlling the flow of air to said engine for combustion purposes, at least one control device movable to establish the value of a condition of engine operation, a manually movable control member, motor means, control means responsive to a condition indicative of the need for operation of said throttle means, and means operable selectively: (1) to connect said member and said throttle means, (2) to place said condition responsive means in control of said motor means and to connect said throttle means to said motor means, or (3) to place said control member in control of said motor means and to connect said control device to said motor means.

4. Control apparatus for an internal combustion engine, comprising throttle means for controlling the flow of air to said engine for combustion purposes, a manually movable control member, motor means, control means responsive to a condition indicative of the need for operation of said throttle means, and means operable selectively: (1) to connect said member and said throttle means, (2) to place said condition responsive means in control of said motor means and to connect said throttle means to said motor means, or (3) to place said control member in control of said motor means and to connect said throttle means to said motor means.

5. Control apparatus for an internal combustion engine, comprising throttle means for controlling the flow of air to said engine for combustion purposes, at least one control device movable to establish the value of a condition of engine operation, a manually movable control member, motor means, control means responsive to a condition indicative of the need for operation of said throttle means, and means operable selectively: (1) to connect said member and said throttle means, (2) to place said condition responsive means in control of said motor means and to connect said throttle means to said motor means, (3) to place said control member in control of said motor means and to connect said control device to said motor means, or (4) to place said control member in control of said motor means and to connect said throttle means to said motor means.

6. Control apparatus including a pair of load devices to be positioned, electrical motor means for positioning said devices including a pair of concentric relatively movable members, electrical winding means on at least one of said members adapted to cause a reaction of said members relative to each other upon energization thereof, means normally effective to lock one of said members against rotation, means operable to connect each of said members to one of said load devices, a pair of electrical circuits for energizing said winding means, means for controlling the energization of one of said circuits in accordance with a condition indicative of the need for operation of the load device connected to said one member, means responsive to the flow of current in said one circuit to release said locking means and to interrupt the other of said circuits, and means in said other circuit for controlling the energization thereof in accordance with a condition indicative of the need for operation of the other of said load devices.

7. Control apparatus for an internal combustion engine, comprising throttle means for controlling the flow of air to said engine for combustion purposes, at least one control device movable to establish the value of a condition of engine operation, a manually movable control member, motor means, control means responsive to a condition indicative of the need for operation of said throttle means and effective to produce selectively opposite control effects in accordance with the direction of departure of said condition from a predetermined value, means for adjusting said control means to select said value, a connection between said adjusting means and said control member, and means operable selectively: (1) to connect said member and said throttle means, (2) to place said condition responsive means in control of said motor means and to connect said throttle means to said motor means, (3) to place said control member in control of said motor means and to connect said control device to said motor means, or (4) to place said control member in control of said motor means and to connect said throttle means to said motor means.

8. Control apparatus for an internal combustion engine, comprising throttle means for controlling the flow of air to said engine for combustion purposes, at least one control device movable to establish the value of a condition of engine operation, a manually movable control member, a single motor, control means responsive to a condition indicative of the need for operation of said throttle means, and means operable selectively: (1) to connect said member and said throttle means, (2) to place said condition responsive means in control of said motor and to connect said throttle means to said mator, (3) to place said control member in control of said motor and to connect said control device to said motor, or (4) to place said control member in control of said motor and to connect said throttle means to said motor.

9. Control apparatus for an internal combustion engine, comprising throttle means for controlling the flow of air to said engine for combustion purposes, a control device movable to control the setting of the propeller pitch governor, a manually movable control member, a single motor, control means responsive to a pressure condition indicative of the need for operation of said throttle means, and means operable selectively: (1) to connect said member and said throttle means, (2) to place said condition responsive means in control of said motor and to connect said throttle means to said motor, (3) to place said control member in control of said motor and to connect said control device to said motor, or (4) to place said control member in control of said motor and to connect said throttle means to said motor.

10. Control apparatus for an internal combustion engine, comprising throttle means for controlling the flow of air to said engine for combustion purposes, a plurality of control devices, each movable to establish the value of a different condition of engine operation, a manually movable control member, a single electrical motor including a pair of concentric relatively movable members and electrical winding means on at least one of said motor members adapted to cause a reaction of said motor members relative to each other upon energization thereof, means normally effective to lock one of said motor members against rotation, a connection between said one motor member and said devices, a connection between the other of said motor members and said throttle means, first clutch means operable to connect said throttle means and said control member, second clutch means in the connection between said control devices and said one motor member, third clutch means in the connection between said throttle means and the other of said motor members, operating means for all said clutch means movable between a first position wherein said first clutch means may be engaged and said second and third clutch means are disengaged and a second position wherein said first clutch means is disengaged and said second and third clutch means may be engaged, means biasing said operating means to said first position, means for holding said operating means in said second position, a worm driven by said other motor member, a sector worm wheel connected to said clutch operating means for movement therewith and adapted to engage said worm, first double-throw switch means, means for normally holding said switch means in a first circuit-closing position and operative as an incident to movement of said operating means to its second position to move said switch means to a second circuit-closing position, second double-throw switch means responsive to the pressure in the intake manifold of said engine and movable to its respective circuit-closing positions in accordance with the direction of departure of said pressure from a predetermined value, adjusting means for selecting said value and connected to said manual control member for movement therewith, third double-throw switch means movable to its respective circuit-closing positions in accordance with the direction of displacement of said throttle means from a position corresponding to that of said control member, fourth double-throw switch means movable to its respective circuit-closing positions in accordance with the direction of displacement of said control devices from positions corresponding to the position of said control member, first electrical circuit means for controlling the energization of said winding means including said first switch means when the latter is in its first circuit-closing position, said first electrical circuit means being effective on completion to cause operation of said other motor member to drive said clutch operating means to said second position and thereby move said first switch means to its second position, second electrical circuit means for controlling the energization of said winding means including said first switch means when the latter is in its second position and said second switch means, third electrical circuit means for controlling the energization of said winding means including said first switch means when the latter is in its second position and said third switch means, fourth electrical circuit means for controlling the energization of said winding means including said first switch means when the latter is in its second position and said fourth switch means, means responsive to the current flow in said fourth circuit means for releasing said locking means and for interrupting said second and third circuit means, and selector switch means for selectively connecting said second and third circuit means to said winding means.

11. Control apparatus for an internal combustion engine, comprising throttle means for controlling the flow of air to said engine for combustion purposes, a plurality of control devices, each movable to establish the value of a different condition of engine operation, cam means for moving each of said devices, means for operating all said cam means simultaneously to maintain a predetermined relationship between said conditions, a manually movable control member, a single electrical motor including a pair of concentric relatively movable members and electrical winding means on at least one of said motor member adapted to cause a reaction of said motor members relative to each other upon energization thereof, means normally effective to lock one of said motor members against rotation, a connection between said one member and said cam operating means, a connection between the other of said members and said throttle means, first clutch means operable to connect said throttle means and said control member, second clutch means in the connection between said control devices and said one motor member, third clutch means in the connection between said throttle means and the other of said motor members, operating means for all said clutch means movable between a first position wherein said first clutch means may be engaged and said second and third clutch means are disengaged and a second position wherein said first clutch means is disengaged and said second and third clutch means may be engaged, means biasing said operating means to said first position, means for holding said operating means in said second position, a worm driven by said other motor member, a sector worm wheel connected to said clutch operating means for movement therewith and adapted to engage said worm, first double-throw switch means, means for normally holding said switch means in a first circuit-closing position and operative as an incident to movement of said operating means to its second position to move said switch means to a second circuit-closing position, second double-throw switch means responsive to the pressure in the intake manifold of said engine and movable to its respective circuit-closing positions in accordance with the direction of departure of said pressure from a predetermined value, adjusting means for selecting said value and connected to said manual control member for movement therewith, third double-throw switch means movable to its respective circuit-closing positions in accordance with the direction of displacement of said throttle means from a position corresponding to that of said control member, fourth double-throw switch means movable to its respective circuit-closing positions in accordance with the direction of displacement of said control devices from positions corresponding to the position of said control member, first electrical circuit means for controlling the energization of said winding means including said first switch means when the latter is in its first circuit-closing position, said first electrical circuit means being effective on completion to cause operation of said other motor member to drive said clutch operating means to said second position and thereby move said first switch means to its second position, second electrical circuit means for controlling the energization of said winding means including said first switch means when the latter is in its second position and said second switch means, third electrical circuit means for controlling the energization of said winding means including said first switch means when the latter is in its second position and said third switch means, fourth electrical circuit means for controlling the energization of said winding means including said first switch means when the latter is in its second position and said fourth switch means, means responsive to the current flow in said fourth circuit means for releasing said locking means and for interrupting said second and third circuit means, and selector switch means for selectively connecting said second and third circuit means to said winding means.

12. Control apparatus comprising an element to be moved between a safe position and an active position, means biasing said element toward said safe position, motor means for driving said element to said active position, a worm connected to said motor means, a sector worm wheel connected to said element, said sector wheel having a first position corresponding to the safe position of said element wherein said wheel engages said worm and a second position corresponding to the active position of said element wherein said wheel is free from said worm, said first and second positions being separated by more than 180° on the periphery of said wheel, means operative when said wheel is driven by said worm to the end of said sector to move said wheel additionally until said second position is reached, and means operable to lock said element in said active position.

13. Control apparatus including a pair of load devices to be positioned, electrical motor means for positioning said devices including a pair of concentric relatively movable members, electrical winding means on at least one of said members adapted to cause a reaction of said members relative to each other upon energization thereof, brake means to lock one of said members against rotation, means biasing said brake means to a position wherein said one member is locked, electrical means operative when energized to release said brake means, means operable to connect each of said members to one of said load devices, a pair of electrical circuits for energizing said winding means, means in one of said circuits for controlling the energization thereof in accordance with a condition indicative of the need for operation of the load device connected thereto, a pair of contacts connected in said other circuit, a relay winding connected in said one circuit, switch means controlled by said relay winding and effective upon energization thereof to complete an energizing circuit for said brake releasing means and to open said contacts, said switch means being effective upon de-energization of said winding to close said contacts, and means in said other circuit for controlling the energization thereof in accordance with a condition indicative of the need for operation of the other of said load devices.

14. Control apparatus for an internal combustion engine, comprising throttle means for controlling the flow of air to said engine for combustion purposes, a plurality of control devices, each movable to establish the value of a different condition of engine operation, cam means for moving each of said devices, means for operating all said cam means simultaneously to maintain a predetermined relationship between said conditions, a manually movable control member, motor means, control means responsive to a condition indicative of the need for operation of said throttle means, and means operable selectively: (1) to connect said member and said throttle means, (2) to place said condition responsive means in control of said motor means and to connect said throttle means to said motor means, or (3) to place said control member in control of said motor and to connect said cam operating means to said motor means.

15. Control apparatus for an internal combustion engine, comprising throttle means for controlling the flow of air to said engine for combustion purposes, a plurality of control devices, each movable to establish the value of a different condition of engine operation, cam means for moving each of said devices, means for operating all said cam means simultaneously to maintain a predetermined relationship between said conditions, a manually movable control member, first and second motor means, control means responsive to a condition indicative of the need for operation of said throttle means and effective to produce selectively opposite control effects in accordance with the direction of departure of said condition from a predetermined value, means for adjusting said control means to select said value, a connection between said adjusting means and said control member, means to place said condition responsive means in control of said first motor means and to connect said throttle means to said first motor means, and means to place said control member in control of said second motor means and to connect said cam operating means to said motor means.

16. Control apparatus for an internal combustion engine, comprising throttle means for controlling the flow of air to said engine for combustion purposes, first motor means for driving said throttle means, a plurality of control devices, each movable to establish the value of a different condition of engine operation, means for positioning said control devices simultaneously to maintain predetermined relationships between said conditions, second motor means for driving said positioning means, control means responsive to the pressure in the intake manifold of said engine and effective to produce selectively opposite control effects in accordance with the direction of departure of said pressure from a predetermined value, means including a manually movable member for adjusting said control means to select said value, means to place said pressure responsive means in control of said first motor means and means to place said manually movable member in control of said second motor means.

17. Control apparatus comprising an element to be moved between a safe position and an active position, means biasing said element toward said safe position, motor means for driving said element to said active position, a worm connected to said motor means, a sector worm wheel connected to said element, said sector wheel having a first position corresponding to the safe position of said element wherein said worm engages one extremity of said sector and a second position corresponding to the active position of said element wherein said wheel is free from said worm, means responsive to the angular position of said wheel for causing rotation of said motor means in a direction such that said worm drives said wheel thru said sector, means operative as an incident to operation of said wheel by said worm to the end of said sector to move said wheel additionally until said second position is reached, and means operable to lock said element in said active position.

18. Clutch means comprising a driving member and a driven member having aligned apertures and rotatable about an axis extending thru said apertures, said members also having radial apertures axially aligned, a shaft extending thru said axial apertures and having a cam surface aligned axially with said radial apertures, a key reciprocable in the radial apertures of one of said members, spring means for holding said key in contact with said cam surface so that upon rotation of said shaft said key is reciprocated in its associated radial aperture by the cam surface, and an extension on said key extending parallel to said shaft, the other of said members having a generally arcuate surface axially aligned with said extension and a notch in said surface adapted to receive said extension, so that when said notch is aligned with said extension and said shaft is turned to permit engagement of said extension and said notch, said members are locked together.

19. Clutch means comprising a driving member, a driven member, a shaft extending thru said members and forming a pivot for said members, a key carried by one of said members and movable radially with respect to said one member, cam means on said shaft for reciprocating said key, and an extension on said key extending parallel to said shaft, the other of said members having a generally arcuate surface axially aligned with said extension and a notch in said surface adapted to receive said extension, so that when said notch is aligned with said extension and said cam means is turned to permit engagement of said extension and said notch, said members are locked together.

20. Control apparatus comprising motor means, a plurality of load devices to be selectively connected to said motor means, a clutch operating shaft, a clutch for connecting each of said load devices to said motor means, each of said clutches comprising a driving member and a driven member pivotally mounted on said shaft, a key carried by one of said members and movable radially with respect to said one member, cam means on said shaft for reciprocating said key, and an extension on said key extending parallel to said shaft, the other of said members having a generally arcuate surface axially aligned with said extension and a notch in said surface adapted to receive said extension, so that when said notch is aligned with said extension and said cam means is turned to permit engagement of said extension and said notch, said members are locked together and means for drivingly connecting said motor means and said shaft.

21. Control apparatus comprising motor means, a driving member connected to said motor, a driven member, a shaft extending thru said members and forming a pivot for said members, a key carried by one of said members and movable radially with respect to said one member, cam means on said shaft for reciprocating said key, and an extension on said key extending parallel to said shaft, the other of said members having a generally arcuate surface axially with said extension and a notch in said surface adapted to receive said extension, so that when said notch is aligned with said extension and said cam means is turned to permit engagement of said extension and said notch, said members are locked together and means for drivingly connecting said motor means and said shaft to operate said cam means to a position permitting engagement of said extension and said notch, said motor means being effective thereafter to rotate said driving member until said extension and said notch are alined.

22. Control apparatus for an internal combustion engine, comprising throttle means for controlling the flow of air to said engine for combustion purposes, a manually movable control member, motor means, control means responsive to a condition indicative of the need for operation of said throttle means, and means operable selectively: (1) to place said condition responsive means in control of said motor means and to connect said throttle means to said motor means, or (2) to place said control member in control of said motor means and to connect said throttle means to said motor means.

23. Control apparatus for an internal combustion engine, comprising throttle means for controlling the flow of air to said engine for combustion purposes, at least one control device movable to establish the value of a condition of engine operation, a manually movable control member, motor means, control means responsive to a condition indicative of the need for operation of said throttle means, and means operable selectively: (1) to place said condition responsive means in control of said motor means and to connect said throttle means to said motor means, or (2) to place said control member in control of said motor means and to connect said control device to said motor means.

24. Control apparatus for an internal combustion engine, comprising throttle means for controlling the flow of air to said engine for combustion purposes, at least one control device movable to establish the value of a condition of engine operation, a manually movable control member, motor means, and means operable selectively: (1) to place said control member in control of said motor means and to connect said control device to said motor means, or (2) to place said control member in control of said motor means and to connect said throttle means to said motor means.

25. Control apparatus for an internal combustion engine, comprising throttle means for controlling the flow of air to said engine for combustion purposes, first motor means for driving said throttle means, a plurality of control devices, each movable to establish the value of a different condition of engine operation, means for positioning said control devices simultaneously to maintain predetermined relationships between said conditions, second motor means for driving said positioning means, control means responsive to a condition indicative of the need for operation of said throttle means and effective to produce selectively opposite control effects in accordance with the direction of departure of said condition from a predetermined value, means including a manually movable member for adjusting said control means to select said value, means to place said pressure responsive means in control of said first motor means and means to place said manually movable member in control of said second motor means.

26. Control apparatus comprising motor means, a rotatable driving member connected to said motor means, a rotatable driven member, a clutch member mounted on one of said rotatable members for rotation therewith, said clutch member being movable with respect to said one member to engage the other of said members to transmit motion thereto, means on said other member to prevent effective engagement thereof by said clutch member except when said rotatable members are at predetermined relative angular positions, operating means for said clutch member movable between a first position wherein said clutch member is disengaged from said other member and a second position wherein said clutch member tends to engage said other member, a driving connection between said motor means and said operating means, and means for controlling said motor means to first drive said operating means to said second position and thereafter to drive said driving member until said members attain said predetermined relative angular positions whereupon said clutch member operatively engages said other rotatable member.

27. Control apparatus for an internal combustion engine, comprising throttle means for controlling the flow of air to said engine for combustion purposes, at least one control device movable to establish the value of a condition of engine operation, motor means, first motion-transmitting means, including first clutch means, operable to connect said motor means and said control device, second motion-transmitting means, including second clutch means, operable to connect said motor means and said throttle means, third clutch means operable to connect said throttle means aid said member, and operating means for all said clutch means movable between a first position wherein said third clutch means may be engaged and said first and second clutch means are disengaged and a second position wherein said third clutch means is disengaged and said first and second clutch means may be engaged.

28. Control apparatus for an internal combustion engine, comprising throttle means for controlling the flow of air to said engine for combustion purposes, at least one control device movable to establish the value of a condition of engine operation, a manually movable control member, motor means, control means responsive to the pressure in the intake manifold of said engine, and means operable selectively: (1) to place said pressure responsive means in control of said motor means and to connect said throttle means to said motor means, or (2) to place said control member in control of said motor means and to connect said control device to said motor means.

29. Control apparatus for an internal combustion engine, comprising throttle means for controlling the flow of air to said engine for combustion purposes, at least one control device movable to establish the value of a condition of engine operation, a manually movable control member, motor means, control means responsive to the rate of flow of combustion air to said engine, and means operable selectively: (1) to place said air flow responsive means in control of said motor means and to connect said throttle means to said motor means, or (2) to place said control member in control of said motor means and to connect said control device to said motor means.

30. Control apparatus for an internal combustion engine, comprising throttle means for controlling the flow of air to said engine for combustion purposes, a manually movable control member, motor means for driving said throttle means, control means responsive to the pressure in the intake manifold of said engine, and means indicative of the speed of said engine to place said condition responsive means in control of said motor means when said speed is above a predetermined value, and to place said control member in control of said motor means when said speed is below said value.

31. Control apparatus for an internal combustion engine, comprising throttle means for controlling the flow of air to said engine for combustion purposes, first motor means for driving said throttle means, control means responsive to a condition indicative of the power output of said engine and effective to produce selectively opposite control effects in accordance with the direction of departure of said condition from a predetermined value, means including a manually movable member for adjusting said control means to select said value, means including said condition responsive means for controlling said first motor means to maintain said selected value, a first control device movable to establish the ignition timing of said engine, a second control device movable to establish the ratio of fuel-to-air supplied to said engine, cam means for positioning said control devices simultaneously, second motor means for driving said positioning means, and means responsive to the position of said manually movable member for controlling said second motor means to cause a following movement of said cam means for each movement of said member, said cam means being contoured to operate said control devices to produce advanced ignition timing and a lean fuel-to-air ratio at intermediate values of engine power output, and retarded ignition timing and a rich fuel-to-air ratio at high values of engine power output.

32. Control apparatus for an internal combustion engine, comprising throttle means for controlling the flow of air to said engine for combustion purposes, first motor means for driving said throttle means, control means responsive to a condition indicative of the power output of said engine and effective to produce selectively opposite control effects in accordance with the direction of departure of said condition from a predetermined value, means including a manually movable member for adjusting said control means to select said value, means including said condition responsive means for controlling said first motor means to maintain said selected value, means for controlling the temperature of the combustion air supplied to said engine, a control device movable to establish the value of combustion air temperature maintained by said control means, cam means for positioning said control device, second motor means for driving said positioning means, and means responsive to the position of said manually movable member for controlling said second motor meons to cause a following movement of said cam means for each movement of said member, said cam means being contoured to operate said control device to decrease the combustion air temperature as the power output of said engine increases.

33. Control apparatus for an internal combustion engine, comprising throttle means for controlling the flow of air to said engine for combustion purposes, first motor means for driving said throttle means, control means responsive to the intake manifold pressure of said engine and effective to produce selectively opposite control effects in accordance with the direction of departure of said pressure from a predetermined value, means including a manually movable member for adjusting said control means to select said value, first means for controlling said first motor means including said condition responsive means and effective to cause movement of said throttle in a closing direction in response to an increase in said pressure, second means for controlling said first motor means in response to the position of said member and effective to cause movement of said throttle in opening and closing directions, respectively, in response to movement of said control member in higher and lower pressure directions, governor means for maintaining the speed of said engine substantially constant, means for adjusting the speed setting of said governor, second motor means for driving said adjusting means, means responsive to the position of said manually movable member for controlling said second motor means, and means associated with said governor for placing said second control means in control of said first motor when said governor is set at a speed less than said value.

LEIGHTON LEE, II.

REFERENCES CITED

The following references are of record in the file of this patent:

UNITED STATES PATENTS

| Number | Name | Date |
| --- | --- | --- |
| 2,224,600 | Howard | Dec. 10, 1940 |
| 2,057,877 | Bragunier | Oct. 20, 1936 |
| 2,217,364 | Halford | Oct. 8, 1940 |
| 2,303,998 | Holley | Dec. 1, 1942 |
| 2,346,916 | Halford et al. | Apr. 18, 1944 |
| 2,336,844 | Buck | Dec. 14, 1943 |

FOREIGN PATENTS

| Number | Country | Date |
| --- | --- | --- |
| 17,512 | Great Britain | Aug. 11, 1904 |

OTHER REFERENCES

Ser. No. 281,826, Stieglitz et al. (A. P. C.), pub. May 18, 1943.